US008001063B2

(12) United States Patent
Tesauro et al.

(10) Patent No.: US 8,001,063 B2
(45) Date of Patent: Aug. 16, 2011

(54) METHOD AND APPARATUS FOR REWARD-BASED LEARNING OF IMPROVED POLICIES FOR MANAGEMENT OF A PLURALITY OF APPLICATION ENVIRONMENTS SUPPORTED BY A DATA PROCESSING SYSTEM

(75) Inventors: Gerald James Tesauro, Croton-on-Hudson, NY (US); Rajarshi Das, New Rochelle, NY (US); Nicholas K. Jong, Bridgewater, NJ (US); Jeffrey O. Kephart, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 12/165,144

(22) Filed: Jun. 30, 2008

(65) Prior Publication Data

US 2009/0012922 A1 Jan. 8, 2009

Related U.S. Application Data

(63) Continuation of application No. 11/337,311, filed on Jan. 23, 2006, now abandoned.

(51) Int. Cl.
*G06F 15/18* (2006.01)
(52) U.S. Cl. .......................................... 706/12
(58) Field of Classification Search ................. 717/142; 714/E11.197
See application file for complete search history.

(56) References Cited

U.S. PATENT DOCUMENTS

| | | | |
|---|---|---|---|
| 6,230,200 B1 | 5/2001 | Forecast et al. | |
| 6,581,048 B1 * | 6/2003 | Werbos | 706/23 |
| 2002/0178103 A1 * | 11/2002 | Dan et al. | 705/37 |
| 2003/0149685 A1 * | 8/2003 | Trossman et al. | 707/2 |
| 2004/0230459 A1 * | 11/2004 | Dordick et al. | 705/4 |
| 2005/0071825 A1 * | 3/2005 | Nagaraj et al. | 717/142 |
| 2005/0141554 A1 | 6/2005 | Hammarlund et al. | |
| 2005/0165925 A1 * | 7/2005 | Dan et al. | 709/224 |
| 2006/0179383 A1 | 8/2006 | Blass et al. | |
| 2006/0224535 A1 | 10/2006 | Chickering et al. | |
| 2007/0006278 A1 * | 1/2007 | Ioan Avram et al. | 726/1 |

OTHER PUBLICATIONS

'Temporal Difference Learning and TD-Gammon': Tesauro, 1995, IEEE Communications of the ACM, vol. 38, No. 3, pp. 58-68.*
'Elements of Artificial Neural Networks': Mehrotra, 1997, MIT press.*

(Continued)

*Primary Examiner* — Jeffrey A Gaffin
*Assistant Examiner* — Peter Coughlan

(57) ABSTRACT

In one embodiment, the present invention is a method for reward-based learning of improved systems management policies. One embodiment of the inventive method involves obtaining a decision-making entity and a reward mechanism. The decision-making entity manages a plurality of application environments supported by a data processing system, where each application environment operates on data input to the data processing system. The reward mechanism generates numerical measures of value responsive to actions performed in states of the application environments. The decision-making entity and the reward mechanism are applied to the application environments, and results achieved through this application are processed in accordance with reward-based learning to derive a policy. The reward mechanism and the policy are then applied to the application environments, and the results of this application are processed in accordance with reward-based learning to derive a new policy.

18 Claims, 5 Drawing Sheets

OTHER PUBLICATIONS

'Cooperative Multi-Agent Learning: The state of the art': Panait, George Mason University, Computer Science, Technical Report-200301; 2003.*

Obitko M. Genetic Algorithms, 2003, [retrieved on Jul. 12, 2010]. Retrieved from Internet:<http://labe.felk.cvut.cz/~obitko/ga/>.*

RL-Based Online Resource Allocation in Multi-Workload Computing Systems. Presented by Gerald Tesauro at the AAAI Fall Symposium on Real-Life Reinforcement Learning, Washington DC, Oct. 22, 2004.

G. Tesauro and R. Das and W. E. Walsh and J. O. Kephart, Utility-function-driven Resource Allocation in Autonomic Systems, Proceedings of ICAC.

G. Tesauro, Online Resource Allocation Using Decompositional Reinforcement Learning, Proceedings of AAAI-05.

R. Das, G. Tesauro, and W. E. Walsh, Model-Based and Model-Free Approaches to Autonomic Resource Allocation, IBM Tech Report 2005.

David Vengerov and Nikolai Iakovlev, A Reinforcement Learning Framework for Dynamic Resource Allocation: First Results, Proceedings of ICAC 2005.

"Routing Routing Protocol Dynamic Routing Unicast Routing Protocol . . . "Sasase, 2004, www.sasase.ics.keio.ac.jp/jugyo/2004/print/Routing%/20Protocol_p.pdf.

* cited by examiner

METHOD AND APPARATUS FOR REWARD-BASED LEARNING OF IMPROVED POLICIES FOR MANAGEMENT OF A PLURALITY OF APPLICATION ENVIRONMENTS SUPPORTED BY A DATA PROCESSING SYSTEM

CROSS REFERENCE TO RELATED APPLICATIONS

This application is a continuation of U.S. patent application Ser. No. 11/337,311, filed Jan. 23, 2006, now abandoned entitled "METHOD AND APPARATUS FOR REWARD-BASED LEARNING OF IMPROVED SYSTEMS MANAGEMENT POLICIES", which is herein incorporated by reference in its entirety.

BACKGROUND

The present invention relates generally to data processing systems, and relates more particularly to autonomic computing (i.e., automated management of hardware and software components of data processing systems). Specifically, the present invention provides a method and apparatus for reward-based learning of improved systems management policies.

Due to the increasing complexity of modern computing systems and of interactions of such systems over networks, there is an urgent need to enable such systems to rapidly and effectively perform self-management functions (e.g., self-configuration, self-optimization, self-healing or self-protection) responsive to rapidly changing conditions and/or circumstances. This entails the development of effective policies pertaining to, for example, dynamic allocation of computational resources, performance tuning of system control parameters, dynamic configuration management, automatic repair or remediation of system faults and actions to mitigate or avoid observed or predicted malicious attacks or cascading system failures.

Devising such policies typically entails the development of explicit models of system behavior (e.g., based on queuing theory or control theory) and interactions with external components or processes (e.g., users submitting jobs to the system). Given such a model, an analysis is performed that predicts the consequences of various potential management actions on future system behavior and interactions and then selects the action resulting in the best predicted behavior. A common problem with such an approach is that devising the necessary models is often a knowledge- and labor-intensive, as well as time consuming, task. These drawbacks are magnified as the systems become more complex. Moreover, the models are imperfect, so the policies derived therefrom are also imperfect to some degree and can be improved.

Thus, there is a need in the art for a method and apparatus for reward-based learning of improved systems management policies.

SUMMARY OF THE INVENTION

In one embodiment, the present invention is a method for reward-based learning of improved systems management policies. One embodiment of the inventive method involves obtaining a decision-making entity and a reward mechanism. The decision-making entity manages a plurality of application environments supported by a data processing system, where each application environment operates on data input to the data processing system. The reward mechanism generates numerical measures of value responsive to actions performed in states of the application environments. The decision-making entity and the reward mechanism are applied to the application environments, and results achieved through this application are processed in accordance with reward-based learning to derive a policy. The reward mechanism and the policy are then applied to the application environments, and the results of this application are processed in accordance with reward-based learning to derive a new policy.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

In one embodiment, the present invention is a method for automatically learning a policy for managing a data processing system or at least one component thereof. The method may be implemented, for example, within a data processing system such as a network, a server, or a client computer, as well as in a data processing system component such as a network router, a storage device, an operating system, a database management program or a web application software platform.

Embodiments of the present invention employ reward-based learning methodologies, including well-known Reinforcement Learning (RL) techniques, in order to generate effective policies (i.e., deterministic or non-deterministic behavioral rules or mappings of computing system states to management actions) for management of a computing system. Within the context of the present invention, the term "reward-based learning" refers to machine learning methods that directly or indirectly learn policies based on one or more temporally related observations of an environment's current state, an action taken in the state, and an instantaneous "reward" (e.g., a scalar measure of value) obtained as a consequence of performing the given action in the given state. Further, within the context of the present invention, "Reinforcement Learning" refers to a general set of trial-and-error reward-based learning methods whereby an agent can learn to make good decisions in an environment through a sequence of interactions. Known Reinforcement Learning methods that may be implemented in accordance with the present invention include value-function learning methods (such as Temporal Difference Learning, Q-Learning or Sarsa), actor-critic methods and direct policy methods (e.g., policy gradient methods).

Figure 1:
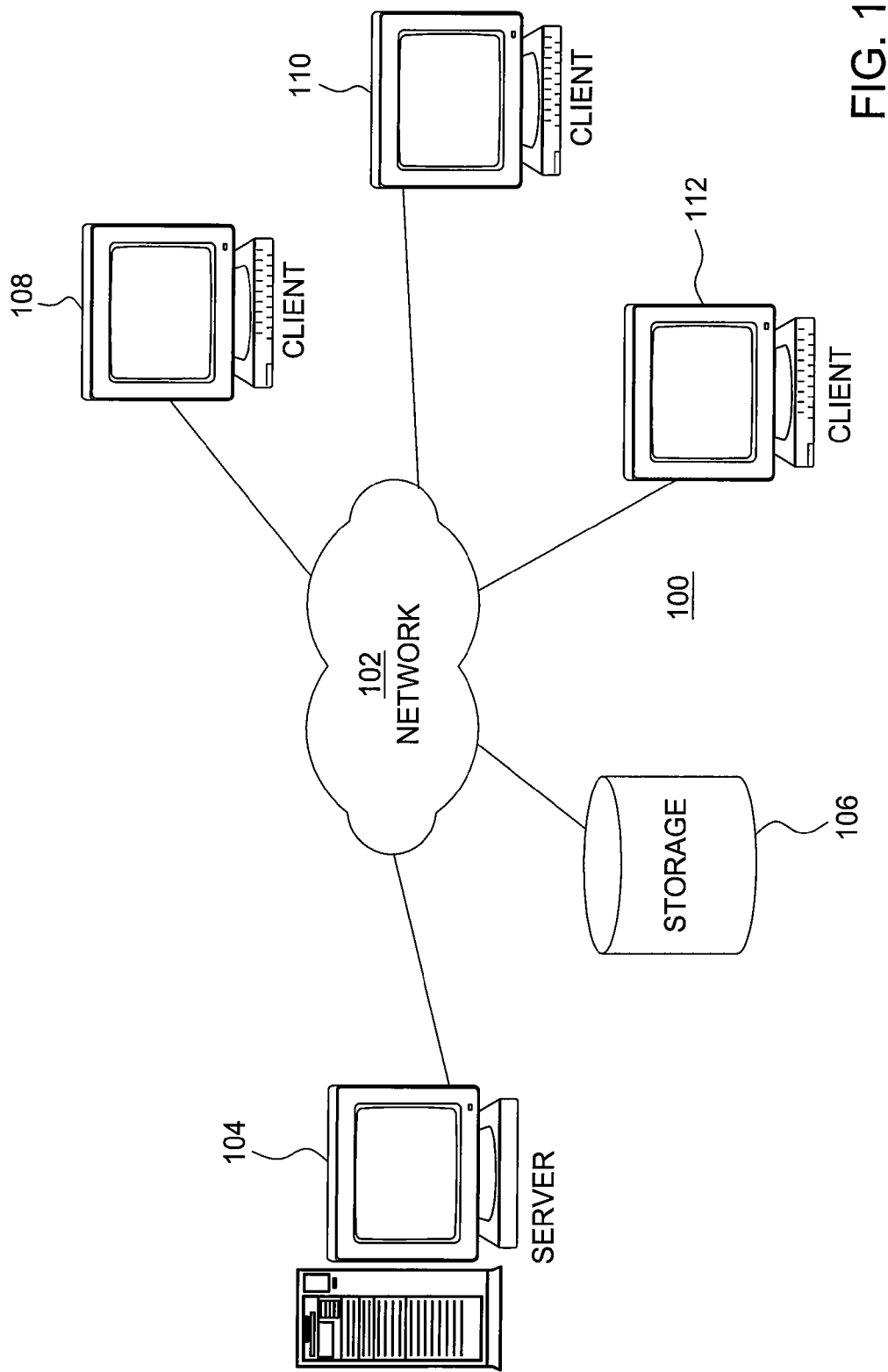
FIG. 1 is a diagram of a networked data processing system in which the present invention may be implemented.

FIG. 1 is a schematic illustration of one embodiment of a network data processing system 100 comprising a network of computers (e.g., clients) in which the present invention may be implemented. The network data processing system 100 includes a network 102, a server 104, a storage unit 106 and a plurality of clients 108, 110 and 112. The network 102 is the medium used to provide communications links between the server 104, storage unit 106 and clients 108, 110, 112 connected together within network data processing system 100. The network 102 may include connections, such as wired or wireless communication links or fiber optic cables.

In the embodiment illustrated, the server 104 provides data, such as boot files, operating system images, and applications to the clients 108, 110, 112 (i.e., the clients 108, 110, and 112 are clients to server 104). The clients 108, 110, and 112 may be, for example, personal computers or network computers. Although the network data processing system 100 depicted in FIG. 1 comprises a single server 104 and three clients, 108, 100, 112, those skilled in the art will recognize that the network data processing system 100 may include additional servers, clients, and other devices not shown in FIG. 1.

In one embodiment, the network data processing system 100 is the Internet, with the network 102 representing a worldwide collection of networks and gateways that use the Transmission Control Protocol/Internet Protocol (TCP/IP) suite of protocols to communicate with one another. In further embodiments, the network data processing system 100 is implemented as an intranet, a local area network (LAN), or a wide area network (WAN). Furthermore, although FIG. 1 illustrates a network data processing system 100 in which the method of the present invention may be implemented, those skilled in the art will realize that the present invention may be implemented in a variety of other data processing systems, including servers (e.g., server 104) and client computers (e.g., clients 108, 110, 112). Thus, FIG. 1 is intended as an example, and not as an architectural limitation for the present invention.

Figure 2:
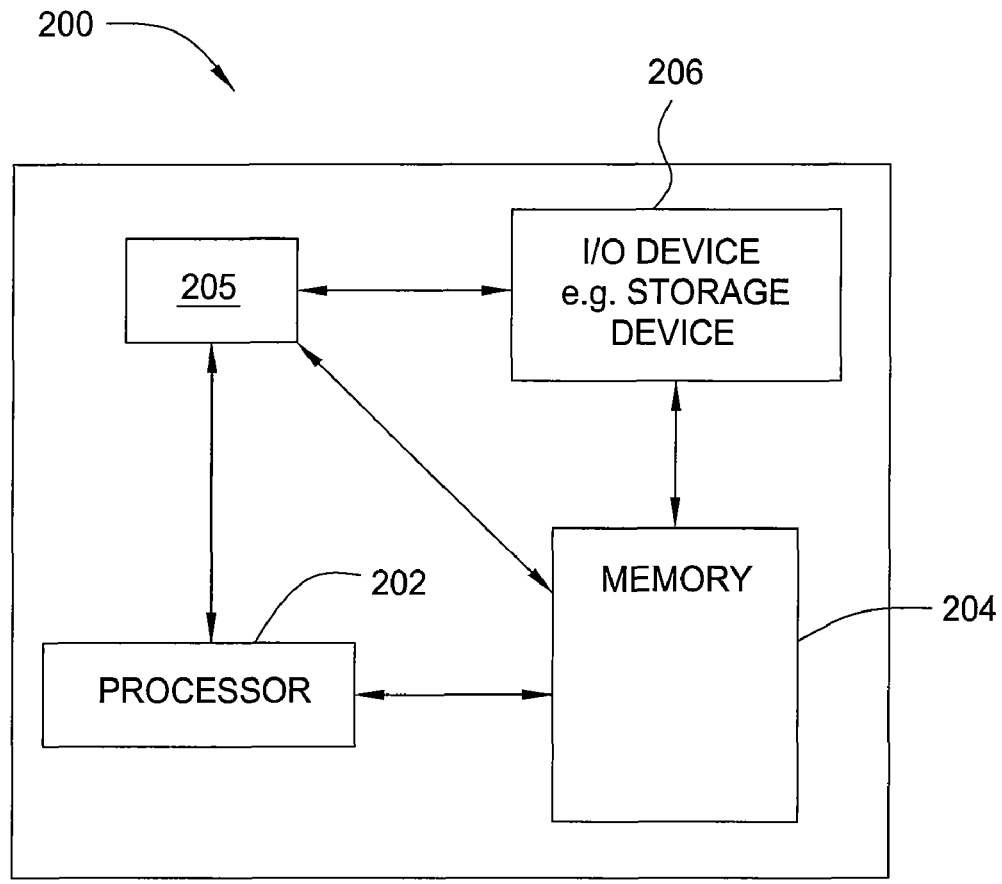
FIG. 2 is a high level block diagram of a single general purpose computing device that has been advantageously adapted to implement the method of the present invention.

For example, FIG. 2 is a high level block diagram of a single general purpose computing device 200 that has been advantageously adapted to implement the method of the present invention. In one embodiment, the general purpose computing device 200 comprises a processor 202, a memory 204, a system management module 205 and various input/output (I/O) devices 206 such as a display, a keyboard, a mouse, a modem, and the like. In one embodiment, at least one I/O device is a storage device (e.g., a disk drive, an optical disk drive, a floppy disk drive). It should be understood that the system management module 205 can be implemented as a physical device or subsystem that is coupled to a processor through a communication channel.

Figure 3:
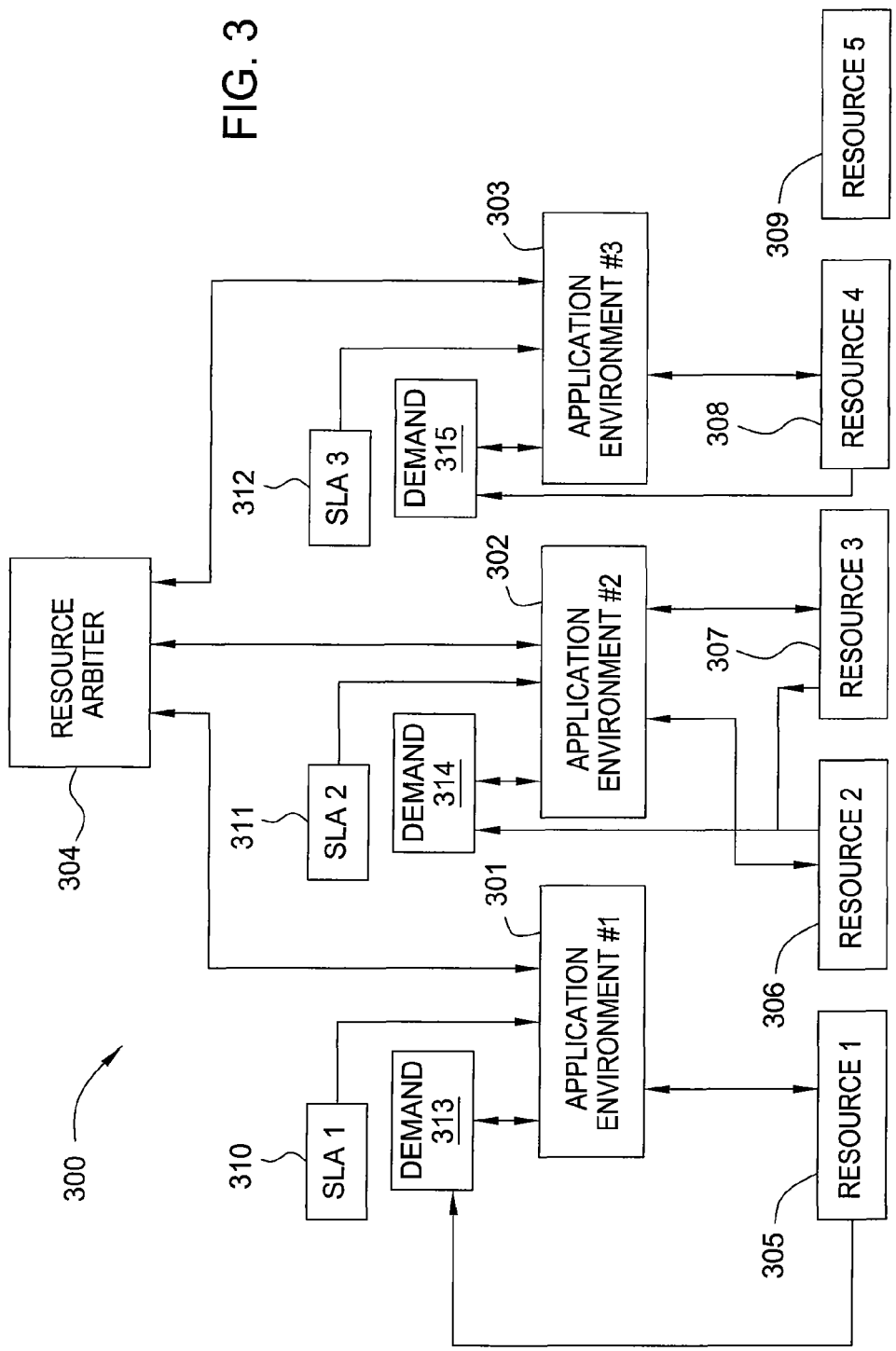
FIG. 3 is a schematic illustration of one embodiment of a data center for executing the method of the present invention.

FIG. 3 is a schematic illustration of one embodiment of a data center 300 for executing the method of the present invention. The data center 300 comprises a plurality of application environment modules 301, 302, and 303, one or more resource arbiters 304 and a plurality of resources 305, 306, 307, 308 and 309. Each application environment module 301-303 is responsible for handling respective demands 313, 314 and 315 (e.g., requests for information processing services) that may arrive from a particular customer or set of clients (e.g., clients 108-112 in FIG. 1). Example client types include: online shopping services, online trading services, and online auction services.

In order to process client demands 313, 314 or 315, the application environments 301-303 may utilize the resources 305-309 within the data center 300. As each application environment 301-303 is independent from the others and provides different services, each application environment 301-303 has its own set of resources 305-309 at its disposal, the use of which must be optimized to maintain the appropriate quality of service (QoS) level for the application environment's clients. An arrow from an application environment 301-303 to a resource 305-309 denotes that the resource 305-309 is currently in use by the application environment 301-303 (e.g., in FIG. 3, resource 305 is currently in use by application environment 301). An application environment 301-303 also makes use of data or software objects, such as respective Service Level Agreements (SLAs) 310, 311 and 312 with its clients, in order to determine its service-level utility function U(S,D). An example SLA 310-312 may specify payments to be made by the client based on mean end-to-end response time averaged over, say, a five-minute time interval. Additionally the client workload may be divided into a number of service classes (e.g., Gold, Silver and Bronze), and the SLA 310-312 may specify payments based on details of response time characteristics within each service class.

Each application environment 301-303 is in further communication with the resource arbiter module 304. The resource arbiter 304 is responsible for deciding, at any given time while the data center 300 is in operation, which resources 305-309 may be used by which application environments 301-303. In one embodiment, the application environments 301-303 and resource arbiter 304 are software modules consisting of autonomic elements (e.g., software components that couple conventional computing functionality with additional self-management capabilities), for example written in Java™, and communication between modules 301-303 and 304 takes place using standard Java interfaces. The modules 301-203 and 304 may run on a single computer or on different computers connected by a network such as the Internet or a Local Area Network (LAN), e.g., as depicted in FIG. 1. In the networked case, communication may additionally employ standard network communication protocols such as TCP/IP and HTTP, and standard Web interfaces such as OGSA.

Figure 4:
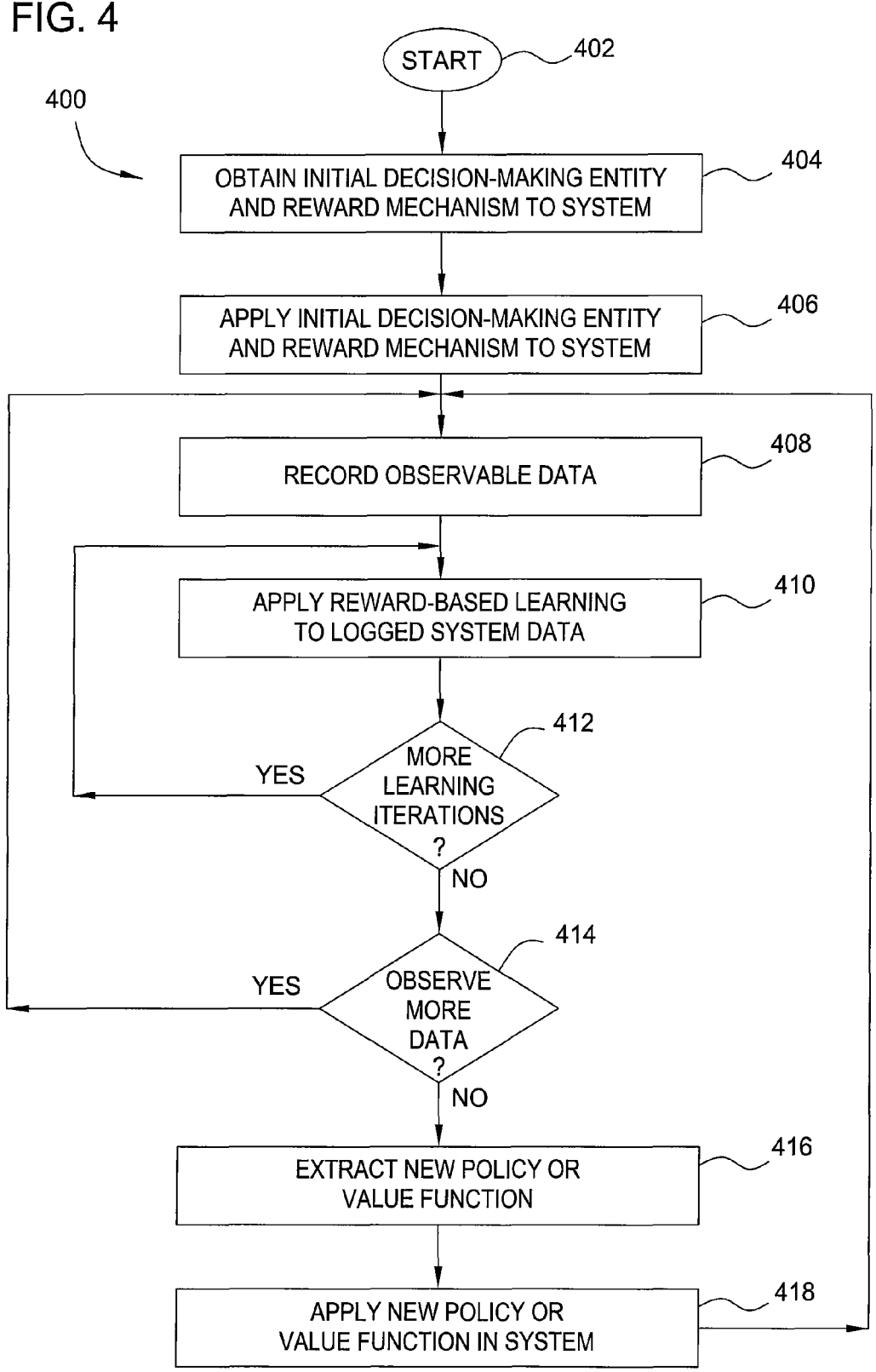
FIG. 4 is a flow chart illustrating a method for deriving a policy for making resource allocation decisions in a computing system.

FIG. 4 is a flow chart illustrating a method 400 for automatically deriving a policy for making management decisions in a computing system. In one embodiment, the computing system is at least one component of a data processing system (e.g., the entire data processing system or just a portion—one or more individual components—thereof). In one embodiment, the policy is for governing the allocation of computing resources (e.g., physical computing resources, virtual computing resources, power to physical computing devices, etc.) within the computing system. The method 400 may be implemented, for example, in an application environment (e.g., application environment 301, 302 or 303 of FIG. 3), which interacts with a resource arbiter (e.g., resource arbiter 304) via an autonomic manager. The method 400 is initialized at block 402 and proceeds to block 404, where the method 400 obtains an initial decision-making entity and a reward mechanism (e.g., from a user of the computing system to which the method 400 is applied). The initial decision making entity is capable of making management decisions affecting the computing system, while the reward mechanism generates numerical measures of value responsive to particular actions performed in particular states of the computing system. In one embodiment, the initial decision-making entity is an automated policy that is not related to or derived from reward-based learning. For example, the policy may be based on a set of hand-crafted behavior rules or on an explicit system performance model. In another embodiment, the initial decision making entity is a human system administrator. In further embodiments, behavior of the initial decision-making entity is not influenced by the learning (e.g., observation of the application of the initial decision-making entity to derive a new, better policy) that occurs in accordance with the method 400, as described in further detail below. In block 406, the method 400 applies the initial policy to the application environment, e.g., via the autonomic manager.

In block 408, the method records at least one instance of observable data pertaining to the computing system running while being managed by the initial decision-making entity. In one embodiment, an observation in accordance with step 408 is defined by a tuple that, at a given time t (where $0 \leq t \leq T$), denotes the computing system's current state, s, an action, a, taken by the initial decision-making entity in state s and a reward, r, generated by the reward mechanism responsive to action a in state s. In addition, the observable data may further include the next state to which the computing system transitioned as a result of the action a in state s. In another embodiment, the observable data additionally includes the result of an internal calculation performed by the initial decision-making entity (e.g., one or more expected-value estimates). In a further embodiment, the observed action, a, may comprise an exploratory "off-policy" action differing from the preferred action of the initial decision-making entity, taken in order to facilitate more effective reward-based learning. The observations are logged by the method 400 as training data for use in deriving a new policy, as described in greater detail below.

In block 410, the method 400 applies a reward-based learning algorithm (e.g., a Reinforcement Learning algorithm) to the training data. In one embodiment, the reward-based learning algorithm incrementally learns a value function, Q(s, a), denoting the cumulative discounted or undiscounted long-range expected value when action a is taken in state s. The value function Q(s, a) induces a new policy by application of a value-maximization principle that stipulates selecting, among all admissible actions that could be taken in state s, the action with the greatest expected value. The value function Q(s, a) may be learned by a value function learning algorithm such as Temporal Distance Learning, Q-Learning or Sarsa. For example, in the Sarsa(0) algorithm, one applies to each observed state/action/reward tuple the following learning algorithm:

$$\Delta Q(s^t, a^t) = \alpha(t)[r^t + \gamma Q(s^{t+1}, a^{t+1}) - Q(s^t, a^t)] \quad \text{(EQN. 1)}$$

where $s^t$ is the initial state at time t, $a^t$ is the action taken at time t, $r^t$ is the immediate reward at time t for taking the action $a^t$ in the initial state $s^t$, $s^{t+1}$ is the next state at time t+1, $a^{t+1}$ is the next action taken at time t+1, $\gamma$ is a constant representing a "discount parameter" having a value between zero and one that expresses the present value of an expected future reward and $\alpha(t)$ is a "learning rate" parameter that decays to zero asymptotically to ensure convergence.

In another embodiment, the reward-based learning algorithm learns a function ✓(s) that directly maps system state s into a selected action. The function ✓(s) may be learned, for example, by a direct policy method (e.g., a policy gradient method). In a further embodiment, the reward-based learning algorithm learns a non-deterministic function ✓(s, a) that denotes the probability of selecting action a in state s. In one embodiment, the reward-based learning algorithm is applied off-line, but in other embodiments may be applied on-line.

In another embodiment, the reward-based learning method comprises learning a state-transition model and an expected reward model, and thereupon using these models to solve for an optimal policy (e.g., by standard Dynamic Programming techniques such as Value Iteration or Policy Iteration).

In block 412, the method 400 determines whether training may be stopped, or whether additional iterations applying the reward-based algorithm to the training data are necessary. In one embodiment, training is stopped if a measure of training error (e.g., Bellman error) has reached a sufficiently small value. In another embodiment, training is stopped if the measure of training error has converged to an asymptotic value, or if it is decreasing at a sufficiently slow rate. In a further embodiment, training is stopped if an upper bound on the number of training iterations has been reached. If the method 400 concludes in block 412 that an additional iteration is needed, the method 400 returns to block 410 and proceeds as described above to re-apply the reward-based algorithm to the training data.

Alternatively, if the method 400 concludes in block 412 that an additional iteration applying the reward-based algorithm to the training data is not necessary, the method 400 proceeds to block 414 and determines whether additional training data needs to be observed. In one embodiment, additional training data needs to be observed if a measure of training error has not yet reached a sufficiently small value. In another embodiment, an overfitting criterion pertaining to the amount of training data required for a particular nonlinear function approximator representing a learned value function or learned policy is applied. If the method 400 concludes in block 414 that additional training data needs to be observed, the method 400 returns to block 408 and proceeds as described above in order to record additional observable data.

Alternatively, if the method 400 concludes in block 414 that additional training data does not need to be observed, the method 400 proceeds to block 416 and extracts a new value function, Q(s, a) or, alternatively, a new policy ✓(s) or ✓(s, a) as output of the reward-based learning process.

In block 418, the method 400 applies the new policy or new value function extracted in block 416 in order to make management decisions in one or more states of the computing system. In one embodiment, the new policy or new value function replaces the initial decision-making entity for all subsequent management decisions; however, in other embodiments, the initial decision-making entity is applied in at least certain specified states. The new policy is expected to be "better" than the initial decision-making entity in the sense that the long-term value of applying the new policy is at least as good as, if not better than, the long-term value of applying the initial decision-making entity in at least one state of the data processing system. The method 400 then returns to step 408 in order to assess application of the new policy or new value function in accordance with the steps described above. In this manner, successive iterations of the method 400 are executed, using the newly derived policies or value functions (e.g., as extracted in block 416) in place of the initial decision-making entities (e.g., applied in block 406).

The method 400 thereby enables the learning of high-quality management policies without an explicit performance model or traffic model, and with little or no built-in system-specific knowledge, by applying reward-based learning. Moreover, off-line training of the reward-based learning algorithm on application log data substantially avoids poor performance issues typically associated with live on-line training, while scalability is enhanced by the by the use of nonlinear function approximators (e.g., multi-layer perceptrons), as described in further detail below with respect to FIG. 5.

Figure 5:
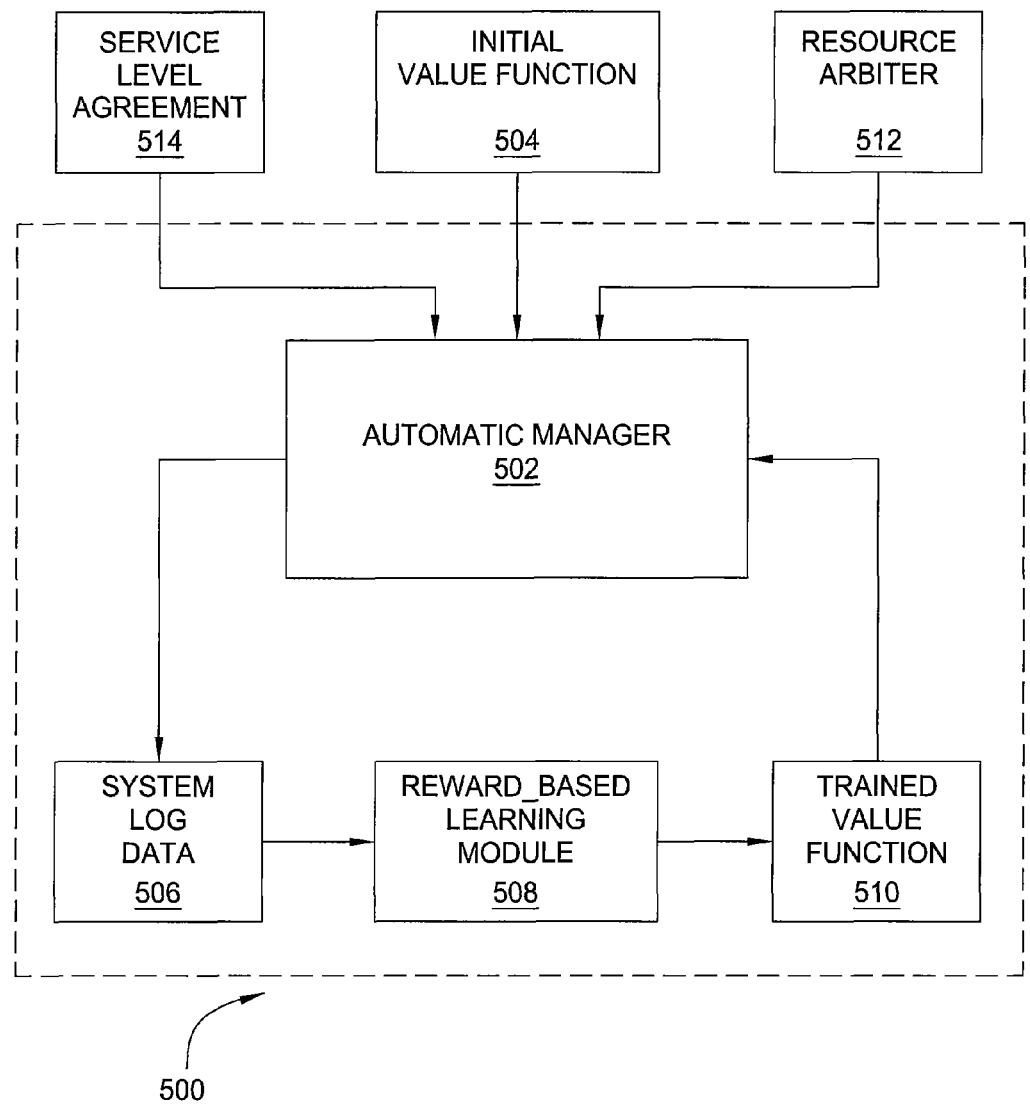
FIG. 5 is a schematic illustration of the basic operations and functionality of one embodiment of an application environment module according to the present invention.

FIG. 5 is a schematic illustration of the basic operations and functionality of one embodiment of an application environment module 500 according to the present invention, wherein the application environment module 500 is any of the application environments 301-303 depicted in FIG. 3. In one embodiment, the application environment 500 comprises at least an autonomic manager element 502, an initial value function module 504, a system log data module 506, a reward-based learning (e.g., Reinforcement Learning) module 508 and a trained value function module 510. Interactions of the application environment 500 with its SLA 514, its client demand, its currently allocated resources, and with the resource arbiter element 512, are depicted as they were in FIG. 3.

In one embodiment, the SLA comprises the reward mechanism as described with respect to FIG. 4. In one embodiment, the SLA specifies payments to be made by the client based on mean end-to-end response time averages over the resource allocation time interval. Additionally, the client workload provided to the application environment 500 may be divided into a number of service classes (e.g., Gold, Silver and Bronze), and the SLA may specify a total payment, summed over the service classes, based on details of response time characteristics within each service class.

The initial value function module 504 provides the basis for an initial policy (as described with respect to FIG. 4) to the autonomic manager 502 for application in the application environment 500. In one embodiment pertaining to open-loop traffic, the initial value function is based on a parallel M/M/1 queuing methodology, which estimates, in the current application state, how a hypothetical change in the number of assigned servers would change anticipated mean response time (and thereby change the anticipated utility as defined by the SLA 514). In another embodiment pertaining to closed-loop traffic, a Mean Value Analysis is used in place of the parallel M/M/1 queuing model.

In accordance with application of this initial policy, the autonomic manager 502 reports observations (i.e., state/action/reward tuples) to the system log data module 506, which logs the observations as training data for the reward-based learning module 508. In one embodiment, the application environment state, s, at time t comprises the average demand (e.g., number of page requests per second) at time t, the mean response time at time t, the mean queue length at time t and the previous resource level assigned at time t−1.

The system log data module 506 provides training data (logged observations) to the reward-based learning module 508, which applies an reward-based learning algorithm to the training data in order to learn a new value function Q(s, n) that estimates the long-term value of the allocation of a specified resource (e.g., n servers) to the application environment operating in its current state s. In one embodiment, the new value function is trained using the Sarsa(0) algorithm as described above with respect to EQN. 1. In one embodiment, the new value function Q(s, n) is represented by a standard multi-layer perceptron function approximator comprising one input unit per state variable in the state description at time t, one input unit to represent the resource level (e.g., number of servers) assigned at time t, a single hidden layer comprising twelve sigmoidal hidden units and a single linear output unit estimating the long-range value function Q(s, n). In one embodiment, iteration of the reward-based learning process consists of training the multi-layer perceptron on the training data by repeatedly performing a series of steps until a maximum number of training steps has been reached. In one embodiment, a random time step, t, is selected, where $0 \leq t \leq T$, such that input to the multi-layer perceptron comprises one of the training observations ($s^t$, $a^t$) and the current output value estimate is $Q(s^t, a^t)$. An output error signal $\Delta Q(s^t, a^t)$ is then computed in accordance with EQN. 1. This error signal is back-propagated using a back-propagation training algorithm to compute small additive positive or negative changes in the weight values of the multi-layer perceptron. These weight values are then changed by adding the computed small changes.

Upon termination of the reward-based learning process in reward-based learning module 508, the trained value function is extracted in the trained value function module 510 and in turn conveyed to the autonomic manager 502. As described above, the autonomic manager 502 may utilize this new trained value function in place of the initial (queuing model-based) value function when reporting resource valuation estimates to the resource arbiter 512. In one embodiment, each of the application environments (e.g., application environments 301, 302 and 303 of FIG. 3) will utilize the same reward-based learning process to derive respective new value functions, and each application environment will replace their respective initial value functions with their respective new trained value functions in a substantially simultaneous manner. It is then expected that the decisions of the resource arbiter 512, which processes value functions received from each application environment in order to compute a globally optimal resource allocation, will be improved on average by applying the trained value functions in place of the initial value functions within each of the application environments.

Although the application environment 500 is illustrated as including discrete modules for system log data and the new (trained) value function, those skilled in the art will appreciate that the autonomic manager 502 may provide system log data directly to the reward-based learning module 508, without the assistance of the system log data module 506. Similarly, the reward-based learning module 508 may report the new trained value function directly to the autonomic manager 502, bypassing the trained value function module 510.

Referring back to FIG. 2, those skilled in the art will also appreciate that the methods of the present invention (e.g., as embodied in the system management module 205) can be represented by one or more software applications (or even a combination of software and hardware, e.g., using Application Specific Integrated Circuits (ASIC)), where the software is loaded from a storage medium (e.g., I/O devices 206) and operated by the processor 202 in the memory 204 of the general purpose computing device 200. Thus, in one embodiment, the system management module 205 implementing the invention described herein with reference to the preceding Figures can be stored on a computer readable medium or carrier (e.g., RAM, magnetic or optical drive or diskette, and the like).

The functionalities of the arbiters and the application environments described with reference to FIGS. 3 and 5 may be performed by software modules of various types. For example, in one embodiment, the arbiters and/or application environments comprise autonomic elements. In another embodiment, the arbiters and/or application environments comprise autonomous agents software as may be constructed, for example, using the Agent Building and Learning Environment (ABLE). The arbiters and/or application environments may all run on a single computer, or they may run independently on different computers. Communication between the arbiters and the application environments may take place using standard interfaces and communication protocols. In the case of arbiters and application environments running on different computers, standard network interfaces and communication protocols may be employed, such as Web Services interfaces (e.g., those employed in the Open Grid Services Architecture (OGSA)).

Thus, the present invention represents a significant advancement in the field of systems management. The present invention enables the learning of high-quality management policies without an explicit performance model or traffic model, and with little or no built-in system-specific knowledge, by applying reward-based learning. Moreover, off-line application of the reward-based algorithm on application log data substantially avoids poor performance issues typically associated with live on-line training, while scalability is enhanced by the by the use of nonlinear function approximators (e.g., multi-layer perceptrons).

While foregoing is directed to the preferred embodiment of the present invention, other and further embodiments of the invention may be devised without departing from the basic scope thereof, and the scope thereof is determined by the claims that follow.

The invenition claimed is:

1. A method for learning a policy for management of a plurality of application environments supported by a data processing system, where the plurality of application environments shares a set of computing resources associated with the data processing system, the method comprising:
    obtaining a decision-making entity for managing said plurality of application environments, where each of said plurality of application environments operates on data input to said data processing system;
    obtaining a reward mechanism for generating numerical measures of value responsive to at least one action performed in at least one state of said plurality of application environments;
    applying said decision-making entity and said reward mechanism to said plurality of application environments in an absence of an explicit performance model for said plurality of application environments;
    processing a result achieved through an application of said decision-making entity and said reward mechanism in accordance with reward-based learning;
    deriving said policy in accordance with said processing;
    applying said reward mechanism and said policy to said plurality of application environments;
    processing a result achieved through said applying said reward mechanism and said policy in accordance with said reward-based learning; and
    deriving a new policy in accordance with said processing said result achieved through said applying said reward mechanism and said policy,
    wherein at least one of: said obtaining the decision-making entity, said obtaining the reward mechanism, said applying, said processing, or said deriving is performed using a processor, and
    wherein said policy is used to allocate said set of computing resources among said plurality of application environments, said set of computing resources comprising at least one of: a physical computing resource, a virtual computing resource, or a power resource to a physical computing device.

2. The method of claim 1, wherein said decision-making entity comprises at least one of: a human administrator, a rule-based method or a system model-based method.

3. The method of claim 1, wherein said result comprises at least one observed state of said plurality of application environments, at least one observed action responsive to said decision-making entity, and at least one observed reward generated by said reward mechanism.

4. The method of claim 3, wherein said result further comprises at least one observed transition of said plurality of application environments from an initial state to a subsequent state.

5. The method of claim 4, wherein said result further comprises at least one observed result of an internal calculation performed by said decision-making entity.

6. The method of claim 4, wherein said at least one observed result of said internal calculation is one or more expected-value estimates.

7. The method of claim 3, wherein said result further comprises at least one exploratory off-policy action that differs from actions responsive to said decision-making entity.

8. The method of claim 1, wherein said processing comprises:
    learning a state transition model;
    learning an expected-reward model; and
    deriving said policy in accordance with said state transition model and said expected-reward model.

9. The method of claim 1, wherein said reward-based learning comprises reinforcement learning.

10. The method of claim 9, wherein said reinforcement learning comprises at least one of: value-function learning, actor-critic learning or direct policy learning.

11. The method of claim 1, wherein said processing is performed off-line.

12. The method of claim 1, wherein said processing is performed on-line.

13. The method of claim 1, wherein said decision-making entity is applied only in one or more specified states of said plurality of application environments.

14. The method of claim 1, wherein a performance measure associated with an application of said policy to said plurality of application environments is greater than a performance measure associated with application of said decision-making entity to said plurality of application environments in at least one state of said plurality of application environments.

15. A computer readable storage device containing an executable program for learning a policy for management of a plurality of application environments supported by a data processing system, where the plurality of application environments shares a set of computing resources associated with the data processing system, where the program performs steps of:
    obtaining a decision-making entity for managing said plurality of application environments, where each of said plurality of application environments operates on data input to said data processing system;
    obtaining a reward mechanism for generating numerical measures of value responsive to at least one action performed in at least one state of said plurality of application environments;
    applying said decision-making entity and said reward mechanism to said plurality of application environments in an absence of an explicit performance model for said plurality of application environments;
    processing a result achieved through an application of said decision-making entity and said reward mechanism in accordance with reward-based learning; and
    deriving said policy in accordance with said processing;
    applying said reward mechanism and said policy to said plurality of application environments;
    processing a result achieved through said applying said reward mechanism and said policy in accordance with said reward-based learning; and deriving a new policy in accordance with said processing said result achieved through said applying said reward mechanism and said policy, wherein said policy is used to allocate said set of computing resources among said plurality of application environments, said set of computing resources comprising at least one of: a physical computing resource, a virtual computing resource, or a power resource to a physical computing device.

16. The computer readable storage device of claim 15, wherein a performance measure associated with an application of said policy to said plurality of application environments is greater than a performance measure associated with application of said decision-making entity to said plurality of application environments in at least one state of said plurality of application environments.

17. The computer readable storage device of claim 15, wherein said reward-based learning comprises reinforcement learning.

18. Apparatus for learning a policy for management of a plurality of application environments supported by a data processing system, where the plurality of application environments shares a set of computing resources associated with the data processing system, the apparatus comprising:

means for obtaining a decision-making entity for managing said plurality of application environments, where each of said plurality of application environments operates on data input to said data processing system;

means for obtaining a reward mechanism for generating numerical measures of value responsive to at least one action performed in at least one state of said plurality of application environments;

means for applying said decision-making entity and said reward mechanism to said plurality of application environments in an absence of an explicit performance model for said plurality of application environments;

means for processing a result achieved through an application of said decision-making entity and said reward mechanism in accordance with reward-based learning; and means for deriving said policy in accordance with said processing;

means for applying said reward mechanism and said policy to said plurality of application environments;

means for processing a result achieved through said applying said reward mechanism and said policy in accordance with said reward-based learning; and means for deriving a new policy in accordance with said processing said result achieved through said applying said reward mechanism and said policy, wherein said policy is used to allocate said set of computing resources among said plurality of application environments, said set of computing resources comprising at least one of: a physical computing resource, a virtual computing resource, or a power resource to a physical computing device.

\* \* \* \* \*